US012354518B2

(12) United States Patent
He et al.

(10) Patent No.: US 12,354,518 B2
(45) Date of Patent: Jul. 8, 2025

(54) BRIGHTNESS DETERMINATION METHOD, DEVICE, DISPLAY PANEL, ELECTRONIC EQUIPMENT, AND STORAGE MEDIUM

(71) Applicants: HEFEI BOE JOINT TECHNOLOGY CO., LTD., Hefei (CN); BOE TECHNOLOGY GROUP CO., LTD., Beijing (CN)

(72) Inventors: Min He, Beijing (CN); Jingbo Xu, Beijing (CN); Song Meng, Beijing (CN); Pengfei Yin, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/150,261

(22) PCT Filed: Dec. 21, 2021

(86) PCT No.: PCT/CN2021/140069
§ 371 (c)(1),
(2) Date: Jan. 5, 2023

(87) PCT Pub. No.: WO2023/115329
PCT Pub. Date: Jun. 29, 2023

(65) Prior Publication Data
US 2025/0148955 A1 May 8, 2025

(51) Int. Cl.
*G09G 3/20* (2006.01)

(52) U.S. Cl.
CPC ... *G09G 3/2092* (2013.01); *G09G 2320/0233* (2013.01); *G09G 2320/0626* (2013.01)

(58) Field of Classification Search
None
See application file for complete search history.

(56) References Cited

U.S. PATENT DOCUMENTS 7,825,876 B2 * 11/2010 Otawara ............... G09G 3/288 345/63
10,417,995 B2 * 9/2019 Xu ........................ G09G 5/10
(Continued)

FOREIGN PATENT DOCUMENTS

CN 103035193 A 4/2013
CN 104580925 A 4/2015
(Continued)

*Primary Examiner* — Sepehr Azari
(74) *Attorney, Agent, or Firm* — Dilworth & Barrese, LLP; Michael J. Musella, Esq.

(57) ABSTRACT

A brightness determination method and device, a display panel, an electronic equipment, and a storage medium are provided. The method includes: determining, based on an image to be displayed, first display brightness values corresponding to the pixels; determining, based on the first display brightness values, a reference average picture level; and determining, based on the reference average picture level and information about a relationship between an average picture level and a maximum display brightness value, a target maximum display brightness value during display of the image to be displayed. The information includes information on variation of the maximum display brightness value with the average picture level in the at least two segment intervals; in different segment intervals, the maximum display brightness value varies at different rates with the average picture level; in at least one segment interval, the maximum display brightness value decreases as the average picture level increases.

16 Claims, 6 Drawing Sheets

(56) References Cited

U.S. PATENT DOCUMENTS

| | | | | |
|---|---|---|---|---|
| 2001/0035850 | A1* | 11/2001 | Okamoto | G09G 5/10 345/204 |
| 2003/0112378 | A1* | 6/2003 | Okunuki | H04N 5/7416 348/E5.127 |
| 2005/0140587 | A1* | 6/2005 | Cho | G09G 3/2944 345/63 |
| 2006/0007250 | A1* | 1/2006 | Jung | G09G 3/2944 345/690 |
| 2006/0221260 | A1* | 10/2006 | Fujine | G09G 3/3611 348/706 |
| 2006/0262039 | A1* | 11/2006 | Hashikawa | G09G 3/294 345/63 |
| 2007/0222738 | A1* | 9/2007 | Yoshida | G09G 3/288 345/101 |
| 2012/0105502 | A1* | 5/2012 | Yokoyama | G09G 3/20 345/690 |
| 2012/0306947 | A1* | 12/2012 | Kim | G09G 3/3233 345/694 |
| 2014/0176625 | A1* | 6/2014 | Yoon | G09G 3/3233 345/691 |
| 2014/0340437 | A1* | 11/2014 | Kohashikawa | G09G 3/3426 345/694 |
| 2015/0062187 | A1* | 3/2015 | Park | G09G 3/3413 345/63 |
| 2015/0170560 | A1* | 6/2015 | Lim | G09G 3/3291 345/691 |
| 2015/0302789 | A1* | 10/2015 | Furihata | G09G 3/2007 345/694 |
| 2018/0082660 | A1* | 3/2018 | Xu | G09G 5/10 |
| 2018/0247581 | A1* | 8/2018 | Sakurai | G09G 3/3426 |
| 2020/0058109 | A1* | 2/2020 | Rhyu | G09G 3/3426 |
| 2021/0020140 | A1* | 1/2021 | Li | G09G 5/10 |
| 2021/0134217 | A1* | 5/2021 | Park | G09G 5/10 |
| 2021/0166604 | A1* | 6/2021 | Lim | G09G 3/2007 |
| 2023/0169930 | A1 | 6/2023 | Pytlarz | |

FOREIGN PATENT DOCUMENTS

| | | | |
|---|---|---|---|
| CN | 107633808 | A | 1/2018 |
| CN | 110085174 | A1 | 8/2019 |
| JP | 2012098559 | A | 5/2012 |
| WO | 2021222310 | A1 | 11/2021 |

* cited by examiner

BRIGHTNESS DETERMINATION METHOD, DEVICE, DISPLAY PANEL, ELECTRONIC EQUIPMENT, AND STORAGE MEDIUM

TECHNICAL FIELD

The embodiment of the present disclosure relates to a brightness determination method, a brightness determination device, a display panel, an electronic equipment, and a computer-readable storage medium.

BACKGROUND

With the continuous development of display technology, display panels have been penetrated into people's work and life. For example, the display panel may be applied to televisions, computers, smart home devices, etc. Commonly used display panels include a liquid crystal display panel and an OLED (Organic Light Emitting Diode) display panel. The OLED display panel has attracted more and more attention because of its high contrast, flexible, fast response, and other advantages.

SUMMARY

At least one embodiment of the present disclosure provides a brightness determination method used for a display panel, the display panel comprises a plurality of pixels, the method comprises: determining, based on an image to be displayed, first display brightness values corresponding to the plurality of pixels respectively; determining, based on the first display brightness values corresponding to the plurality of pixels respectively, a reference average picture level corresponding to the image to be displayed; and determining, based on the reference average picture level and information about a relationship between an average picture level and a maximum display brightness value, a target maximum display brightness value corresponding to the display panel during display of the image to be displayed. A value range corresponding to the average picture level comprises at least two segment intervals, the information about the relationship comprises information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases.

For example, in the brightness determination method provided by an embodiment of the present disclosure, for any two contrast segment intervals of the at least two segment intervals, the any two contrast segment intervals comprise a first contrast segment interval and a second contrast segment interval, a maximum value of the average picture level in the first contrast segment interval is less than or equal to a minimum value of the average picture level in the second contrast segment interval. A rate of variation of the maximum display brightness value in the first contrast segment interval is less than or equal to a rate of variation of the maximum display brightness value in the second contrast segment interval.

For example, in the brightness determination method provided by an embodiment of the present disclosure, the value range corresponding to the average picture level comprises a minimum value, an intermediate value, and a maximum value, the intermediate value is an average value of the maximum value and the minimum value, and a quantity of segment intervals in a range from the minimum value to the intermediate value is greater than a quantity of segment intervals in a range from the intermediate value to the maximum value.

For example, in the brightness determination method provided by an embodiment of the present disclosure, the at least two segment intervals comprise a first segment interval, the maximum display brightness value remains constant as the average picture level varies in the first segment interval, the maximum display brightness value is a predetermined brightness value.

For example, in the brightness determination method provided by an embodiment of the present disclosure, a value of the average picture level in the first segment interval is less than a value of the average picture level in remaining segment intervals of the at least two segment intervals other than the first segment interval.

For example, in the brightness determination method provided by an embodiment of the present disclosure, the at least two segment intervals further comprise a second segment interval, a third segment interval, and a fourth segment interval, a value of the average picture level is continuous from the first segment interval to the fourth segment interval and successively increases from the first segment interval to the fourth segment interval. In the second segment interval, the information about the relationship between the maximum display brightness value and the average picture level is expressed as a relationship formula: $Lmax=L*(a1-b1*APL)$, where Lmax is the maximum display brightness value, L is the predetermined brightness value, APL is the average picture level, and a1 and b1 are constants; in the third segment interval, the information about the relationship between the maximum display brightness value and the average picture level is expressed as a relationship formula: $Lmax=L*(a2*APL^2-b2*APL+c2)$, where a2, b2, and c2 are constants; and in the fourth segment interval, the information about the relationship between the maximum display brightness value and the average picture level is expressed as a relationship formula: $Lmax=L*(a3-b3*APL)$, where a3 and b3 are constants.

For example, in the brightness determination method provided by an embodiment of the present disclosure, the value range corresponding to the average picture level comprises a minimum value, a first value, a second value, a third value, and a maximum value, the first value, the second value, and the third value are between the minimum value and the maximum value and increase in turn. The minimum value and the first value are two interval endpoints of the first segment interval, respectively; the first value and the second value are two interval endpoints of the second segment interval, respectively; the second value and the third value are two interval endpoints of the third segment interval, respectively; and the third value and the maximum value are two interval endpoints of the fourth segment interval, respectively.

For example, in the brightness determination method provided by an embodiment of the present disclosure, determining, based on the first display brightness values of the plurality of pixels, the reference average picture level corresponding to the image to be displayed, comprises: determining, according to all the first display brightness values corresponding to the plurality of pixels, the reference average picture level corresponding to the image to be displayed.

For example, in the brightness determination method provided by an embodiment of the present disclosure, determining, based on the first display brightness values of the plurality of pixels, the reference average picture level corresponding to the image to be displayed, comprises: determining at least one target pixel from the plurality of pixels; determining, based on first display brightness value corresponding to the at least one target pixel, the reference average picture level corresponding to the image to be displayed.

For example, in the brightness determination method provided by an embodiment of the present disclosure, determining the at least one target pixel from the plurality of pixels, comprises: selecting at least one pixel whose first display brightness value is greater than a brightness threshold from the plurality of pixels as the at least one target pixel.

For example, in the brightness determination method provided by an embodiment of the present disclosure, determining the at least one target pixel from the plurality of pixels, comprises: determining, based on the image to be displayed, display colors corresponding to the plurality of pixels respectively; determining, based on the display colors corresponding to the plurality of pixels respectively, at least one target display color, where a ratio between a quantity of pixels displaying each of the at least one target display color and a quantity of the plurality of pixels is greater than a proportion threshold; selecting at least one pixel corresponding to the target display color from the plurality of pixels as the at least one target pixel.

For example, the brightness determination method provided by an embodiment of the present disclosure further comprises: determining, based on the target maximum display brightness value, a plurality of second display brightness values corresponding to the plurality of pixels during the display of the image to be displayed; and displaying, based on the plurality of second display brightness values, the image to be displayed.

At least one embodiment of the present disclosure provides a brightness determination device used for a display panel, the display panel comprises a plurality of pixels, and the brightness determination device comprises: a first determination module, a second determination module, and a third determination module. The first determination module is configured to determine, based on an image to be displayed, first display brightness values corresponding to the plurality of pixels, respectively; the second determination module is configured to determine a reference average picture level corresponding to the image to be displayed based on the first display brightness values corresponding to the plurality of pixels respectively; and the third determination module is configured to determine a target maximum display brightness value corresponding to the display panel during display of the image to be displayed based on the reference average picture level and information about a relationship between an average picture level and a maximum display brightness value. The information about the relationship comprises information on variation of the maximum display brightness value with the average picture level in at least two segment intervals of the average picture level; in different segment intervals, the maximum display brightness value varies at different rates with the average picture level; in at least one of the segment intervals, the maximum display brightness value decreases as the average picture level increases.

At least one embodiment of the present disclosure provides a display panel, comprising: a plurality of pixels, a data driver, a gate driver, and a timing controller, the data driver is configured to provide data signals to the plurality of pixels, the gate driver is configured to provide gate scan drive signals to the plurality of pixels; and the timing controller is configured to perform the brightness determination method provided in any of the embodiments of the present disclosure.

At least one embodiment of the present disclosure provides an electronic equipment, comprising: a processor; and a memory configured to store one or more computer program modules. The one or more computer program modules are configured to be executed by the processor, and the one or more computer program modules comprise instructions for implementing the brightness determination method provided in any of the embodiments of the present disclosure.

At least one embodiment of the present disclosure provides a computer-readable storage medium for storing non-transitory computer-readable instructions, and the brightness determination method provided in any of the embodiments of the present disclosure is implemented when the non-transitory computer-readable instructions are executed by a computer.

BRIEF DESCRIPTION OF DRAWINGS

In order to explain the technical solutions of embodiments of the present disclosure more clearly, the drawings of the embodiments will be briefly introduced below. Obviously, the drawings in the following description only relate to some embodiments of the present disclosure, rather than limit the present disclosure.

DETAILED DESCRIPTION

Figure 1:
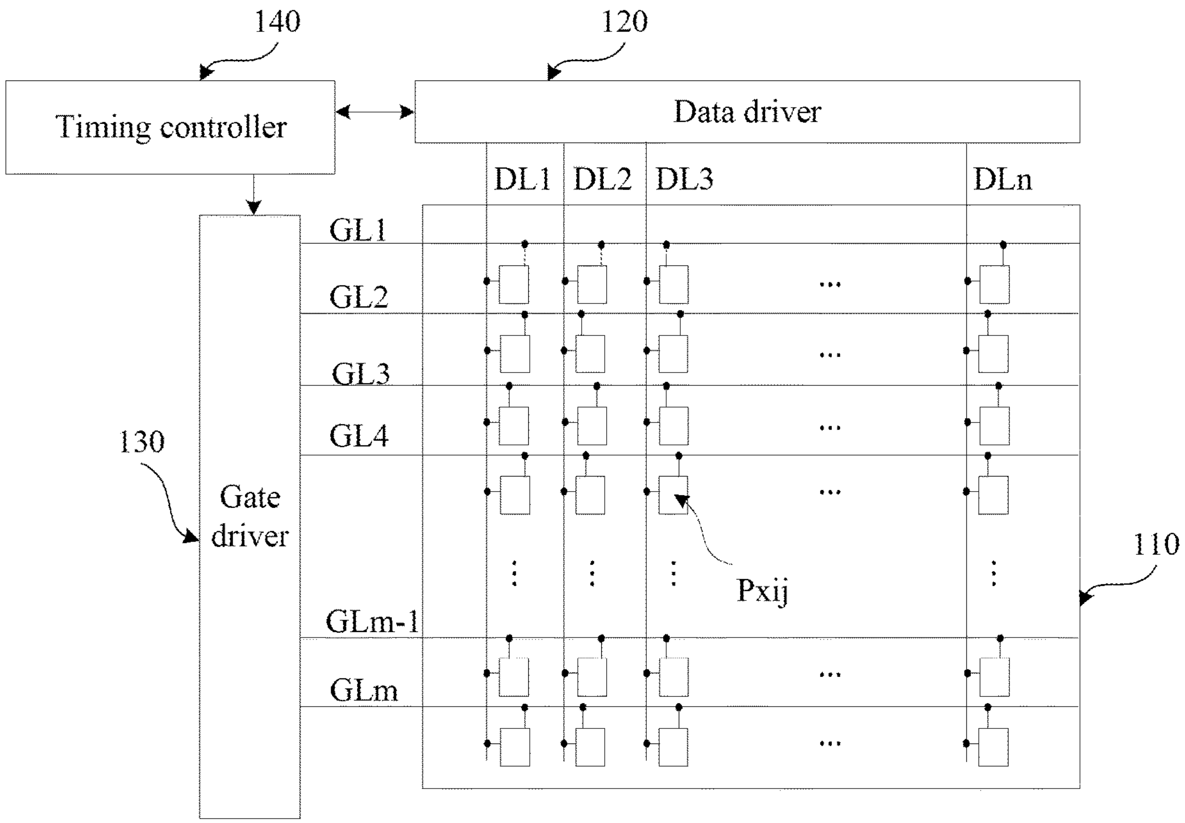
FIG. 1 shows a schematic diagram of a display panel according to at least one embodiment of the present disclosure.

In order to make objects, technical solutions, and advantages of the embodiments of the present disclosure more apparent, the technical solutions of the embodiments of the present disclosure will be described clearly and completely below in connection with the accompanying drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used in the present disclosure shall have the same meanings as commonly understood by one of ordinary skill in the art to which the present disclosure belongs. The terms "first," "second," etc., which are used in the present disclosure, are not intended to indicate any sequence, amount, or importance, but only used to distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor found that in the relevant technology, in the process of determining the display brightness of each image frame, the brightness is usually determined according to gray scale of each pixel in the image, and for different images, the brightness values of the images during display are determined based on the same relational expression. The higher the gray scale of the image, the greater the display brightness. Therefore, in the case where the overall gray scale of the image is higher, the overall brightness of the display panel is greater, which is easy to cause high power consumption. In the case where the overall gray scale of the image is low, the display screen displayed on the display panel will be relatively dark and the details will be insufficient.

At least one embodiment of the present disclosure provides a brightness determination method, a brightness determination device, a display panel, an electronic equipment, and a computer-readable storage medium. The brightness determination method includes: determining, based on an image to be displayed, first display brightness values corresponding to the plurality of pixels respectively; determining, based on the first display brightness values corresponding to the plurality of pixels respectively, a reference average picture level corresponding to the image to be displayed; and determining, based on the reference average picture level and information about a relationship between an average picture level and a maximum display brightness value, a target maximum display brightness value corresponding to the display panel during display of the image to be displayed. A value range corresponding to the average picture level includes at least two segment intervals, the information about the relationship includes information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases.

According to the brightness determination method of the embodiment of the present disclosure, by reducing the maximum display brightness value as the average picture level increases in at least part of the segment intervals, the overall display brightness of the image to be displayed can be appropriately reduced in the case where the overall gray scale of the image to be displayed is relatively high, thereby reducing power consumption, avoiding the problem of high power consumption due to the high display brightness of the display screen; the overall display brightness of the image to be displayed can be increased in the case where the overall gray scale of the image to be displayed is relatively low, thereby enhancing the detail performance, increasing the contrast, and improving the display effect. In addition, by making the maximum display brightness value have different variation rates in different segment intervals, the brightness can be adjusted in segments, thus making the brightness adjustment more flexible. For example, the average picture level may be divided into several segments according to the sensitivity of human eyes to brightness variation, and the brightness variation rate conforming to the viewing comfort of human eyes may be set in different segments, which helps to improve the comfort of human eyes when viewing and achieve better viewing effect.

FIG. 1 shows a schematic diagram of a display panel according to at least one embodiment of the present disclosure.

As shown in FIG. 1, the display panel may be an OLED display panel, the display panel includes a pixel array 110 and a panel driver. The pixel array 110 includes a plurality of rows and a plurality of columns of pixels Pxij arranged in an array. The panel driver is configured to drive the pixel array 110. The panel driver may include a data driver 120, a gate driver 130, and a timing controller 140. The brightness determination method of the embodiment of the present disclosure may be performed by the timing controller 140, for example.

For example, in some examples, the pixel array 110 may further include a plurality of scan signal lines (e.g., GL1 to GLm) connected to the plurality of rows and the plurality of columns of pixels and a plurality of data signal lines (e.g., DL1 to DLn) connected to the plurality of rows and the plurality of columns of pixels, etc., i, j, m, and n are all positive integers.

For example, in some examples, the plurality of scan signal lines GL1 to GLm extend in a first direction (e.g., horizontal direction) on the display panel, and the plurality of data signal lines DL1 to DLn may extend in a second direction (e.g., vertical direction) on the display panel. The first direction and the second direction cross, for example, the first direction is perpendicular to the second direction. The plurality of data signal lines are configured to intersect with the plurality of scan signal lines.

For example, in some examples, each pixel Pxij in the pixel array 110 may be electrically connected to a corresponding data signal line and a corresponding scan signal line.

For example, in some examples, a scan drive circuit included in the gate driver 130 may be disposed on a side of the pixel array 110 (e.g., on a side of the pixel array in the first direction, such as the left side or right side as shown in FIG. 1), as shown in FIG. 1, the scan drive circuit included in the gate driver 130 is disposed on the left side of the pixel array 110 in the first direction. However, the embodiments are not limited to this. For example, the gate driver 130 is provided on both opposite sides of the pixel array 110 to achieve bilateral driving of the pixel array 110.

For example, in some examples, the pixel Pxij includes a pixel circuit and a light-emitting element, and the pixel circuit may be a 3T1C (T represents a transistor, C represents a capacitor), 4T1C, 5T1C, 5T2C, 6T1C, or 7T1C structure, which is not limited in the embodiments of the present disclosure. The light-emitting element may be, for example, an organic light-emitting diode (OLED) or a quantum dot light-emitting diode (QLED), and the embodiments of the present disclosure are not limited thereto.

For example, in some examples, the gate driver 130 may be formed using an integrated circuit, or may be formed directly on the substrate of the display panel during the process of preparing the pixel circuit. However, the embodiments are not limited thereto.

For example, the timing controller 140 may provide a control signal suitable for the specification of the data driver 120 to the data driver 120. The data driver 120 may generate data signals to be provided to the data signal lines DL1 to DLn according to the control signal received from the timing controller 140, and further, the data signal lines DL1 to DLn provide the data signals to the plurality of pixels included in the pixel array.

For example, the timing controller 140 may further provide a clock signal, a scan start signal, and other signals, suitable for the specification of the gate driver 130 to the gate driver 130. The gate driver 130 may generate gate scan drive signals to be supplied to the scan signal lines GL1 to GLm according to the clock signal, the scan start signal, and other signals received from the timing controller 140. Further, the scan signal lines GL1 to GLm provide the gate scan drive signals to the plurality of pixels included in the pixel array. For example, the gate driver 130 may include a scan drive circuit, and the scan drive circuit can sequentially supply the gate scan drive signals having the turn-on level pulse to the scan signal lines GL1 to GLm. For example, the scan drive circuit may be constructed in the form of a shift register, and the scan drive circuit can generate the gate scan drive signal by sequentially transmitting the scan start signal provided in the form of turn-on level pulse to the next-stage circuit under the control of the scan clock signal.

For example, the pixel circuit of each pixel operates under the control of the data signal transmitted through the data signal line and the gate scan drive signal transmitted through the scan signal line, to drive the light-emitting element of the pixel to emit light, thereby implementing display and other operations.

For example, the display panel may be a 55 inch 4K OLED display panel, a 49 inch OLED display panel, a 55 inch 8K OLED display panel, etc.

Figure 2:
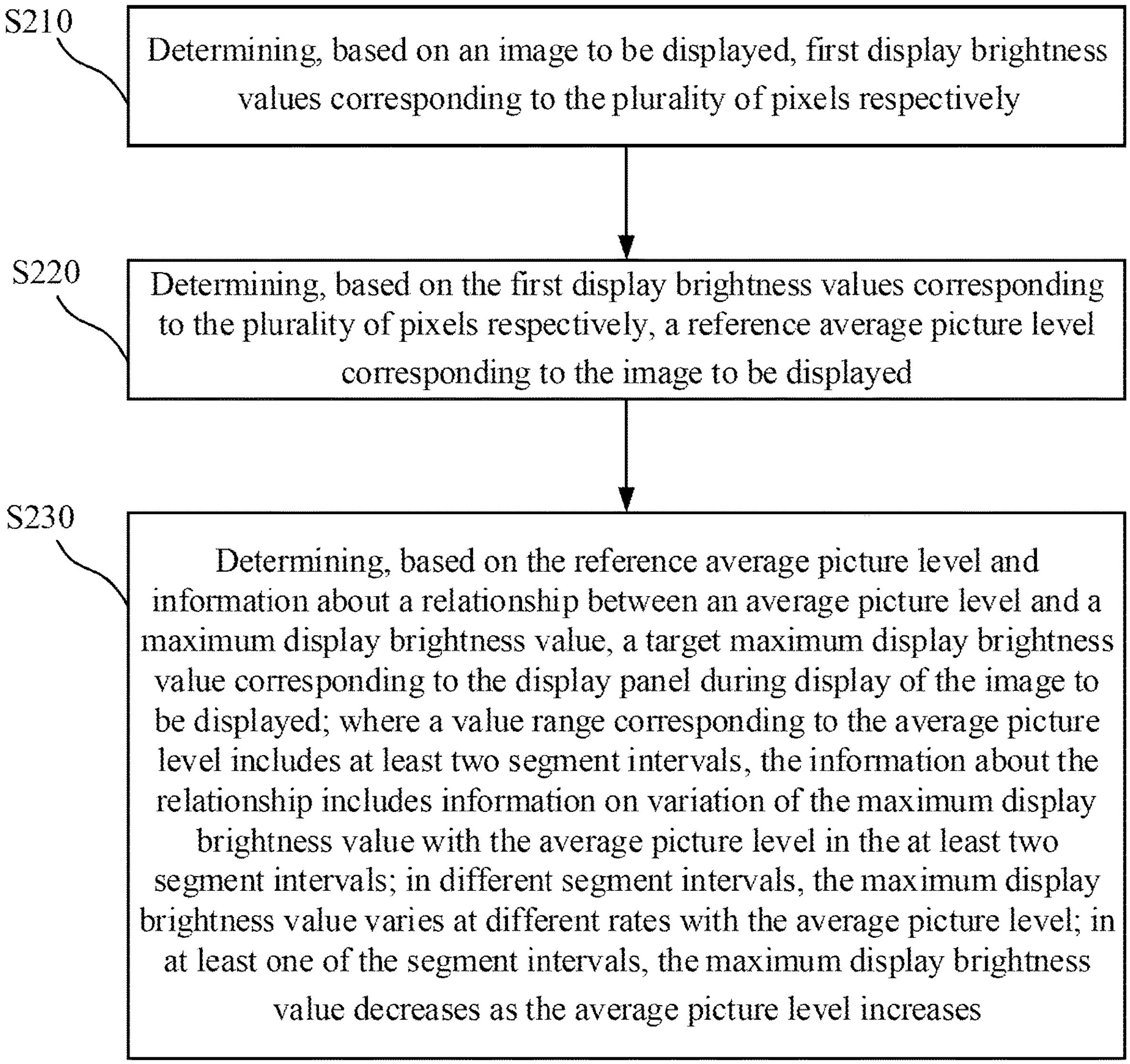
FIG. 2 shows a flow chart of a brightness determination method according to at least one embodiment of the present disclosure.

FIG. 2 shows a flow chart of a brightness determination method according to at least one embodiment of the present disclosure.

As shown in FIG. 2, the brightness determination method may be applied to the display panel shown in FIG. 1, for example, the brightness determination method may include steps S210 to S230.

Step S210: determining, based on an image to be displayed, first display brightness values corresponding to the plurality of pixels respectively.

Step S220: determining, based on the first display brightness values corresponding to the plurality of pixels respectively, a reference average picture level corresponding to the image to be displayed.

Step S230: determining, based on the reference average picture level and information about a relationship between an average picture level and a maximum display brightness value, a target maximum display brightness value corresponding to the display panel during display of the image to be displayed.

For example, a value range corresponding to the average picture level includes at least two segment intervals, the information about the relationship includes information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases, that is, the value of the maximum display brightness decreases as the value of the average picture level increases.

For example, in step S210, the gray scale information of the image to be displayed may be acquired first, and then the first display brightness value of each pixel corresponding to the image to be displayed may be determined according to the gray scale information. For example, the step S210 may be performed by the method of determining the brightness value based on the gray scale in the related technology. The embodiments of the present disclosure will not be repeated here.

For example, in step S220, the average picture level (APL) corresponding to the image to be displayed, that is, the above-described reference average picture level, may be determined according to the first display brightness values of the respective pixels. The reference average picture level can reflect the overall brightness of the image to be displayed.

For example, in some examples, in step S220, the reference average picture level corresponding to the image to be displayed may be determined according to the first display brightness values of all pixels, in the display panel, for displaying the image to be displayed. In the embodiment of the present disclosure, the reference average picture level is determined according to the first display brightness values of all pixels for displaying the image to be displayed in the display panel, which can make the reference average picture level accurately reflect the brightness of the image to be displayed, thereby helping to improve the accuracy of the target maximum display brightness value determined according to the reference average picture level. It should be noted that total pixels, in the display panel, for displaying the image to be displayed may be all pixels in the display panel or some of the pixels in the display panel, which are determined according to the image to be displayed. The embodiment of the present disclosure are described by taking a case that total pixels, in the display panel, for displaying the image to be displayed are all pixels in the display panel as an example.

For example, the calculation formula of the reference average picture level is shown as the following formula (1).

$$APL = sum\_all / k1 \tag{1}$$

In the formula (1), APL is the reference average picture level, k1 is a constant (k1 makes the value of APL between 0 and 1), sum_all is the sum of the first display brightness values of all pixels, in the display panel, for displaying the image to be displayed. For example, in the case that the display panel includes R (red) pixels, G (green) pixels, and B (blue) pixels, sum_all=sum_R+sum_G+sum_B, sum_R is the sum of the first display brightness values of all red pixels, in the display panel, for displaying the image to be displayed, sum_G is the sum of the first display brightness values of all green pixels, in the display panel, for displaying the image to be displayed, sum_B is the sum of the first display brightness values of all blue pixels, in the display panel, for displaying the image to be displayed. In the case that the display panel includes R (red) pixels, G (green) pixels, B (blue) pixels, and W (white) pixels, sum_all=sum_R+sum_G+sum_B+sum_W, sum_W is the sum of the first display brightness values of all white pixels, in the display panel, for displaying the image to be displayed.

For example, the APL may be normalized to a value between 0 and 1 using a constant. In the case where the display panel does not display pictures, the brightness values of all pixels are 0, and the APL may be defined as 0 (that is, APL=0).

For example, in the case of two different color pixels being displayed in mixed under the maximum gray scale (255 gray scale) and 100% full screen display, the APL is defined as 1 (APL=1). That is, APL=1 corresponds to a display condition of mixed colors (such as RG, GB, RB), the maximum gray scale (255 gray scale), and 100% full screen display, R represents red, G represents green, B represents blue, and W represents white. For example, under the condition that all red pixels and all green pixels in the display panel are displayed in 255 gray scale, APL=1.

For example, APL=0.5 corresponds to a display condition of monochrome (R, G, B, or W), the maximum gray scale (255 gray scale), and 100% full screen display. For example, under the condition that all red pixels in the display panel are displayed in 255 gray scale and no color other than red is displayed, APL=0.5.

For example, APL=0.125 corresponds to the display condition of monochrome (R, G, B, or W), 255 gray scale, and 25% window display. For example, in the case where red pixels in 25% window of the display panel are displayed in 255 gray scale and no other colors except red are displayed, APL=0.125. For example, the x % (x is a value between 0 and 100) window in the embodiments of the present disclosure may represent a display region that occupies x % of the full screen display region (the display region=x %*full screen display region).

For example, APL=0.05 corresponds to the display condition of monochrome (R, G, B, or W), 255 gray scale, and 10% window display. For example, in the case where red pixels in 10% window of the display panel are displayed in 255 gray scale and no other colors except red are displayed, APL=0.05.

For example, generally, the situation is less likely to occur that more than two colors are displayed in mixed under the maximum gray scale, for example, three colors are displayed in mixed under the maximum gray scale. If such a situation exists, the corresponding APL is set to 1.

For example, in some other examples, in step S220, the reference average picture level may also be determined in the following method: determining at least one target pixel of the plurality of pixels; determining, based on at least one first display brightness value corresponding to the at least one target pixel, the reference average picture level corresponding to the image to be displayed.

For example, part pixels are selected from the plurality of pixels and are used as the target pixels. Then, the reference average picture level is calculated according to the first display brightness values of the part pixels. For example, the result of normalizing the sum of the first display brightness values of all target pixels may be used as the reference average picture level. In the embodiments of the present disclosure, determining the average picture level according to the first display brightness values of part pixels can increase the calculation speed and improve the processing efficiency. The target pixels may be selected from the plurality of pixels according to one of the following two methods.

For example, in the first method, at least one pixel whose first display brightness value is greater than a brightness threshold may be selected from the plurality of pixels, and the at least one pixel is the at least one target pixel. That is, the first display brightness value corresponding to each target pixel is greater than the brightness threshold. For example, the brightness threshold may be the average value of the first display brightness values of all pixels, in the display panel, for displaying the image to be displayed, or the brightness threshold may be the median (that is, the value in the middle of the data sequence formed by sorting, in the order of numerical values, the first display brightness values of all pixels, in the display panel, for displaying the image to be displayed) of the first display brightness values of all pixels, in the display panel, for displaying the image to be displayed, or the brightness threshold may be other values determined according to actual needs. In other words, a pixel with a larger brightness value may be selected from the plurality of pixels as the target pixel.

For example, in the second method, display colors corresponding to the plurality of pixels respectively may be determined based on the image to be displayed; at least one target display color is determined based on the display colors corresponding to the plurality of pixels respectively, a ratio between the quantity of pixels displaying each of the at least one target display color and the quantity of the plurality of pixels is greater than a proportion threshold; at least one pixel corresponding to the target display color is selected from the plurality of pixels, and the at least one pixel is the at least one target pixel.

For example, first, the number of pixels corresponding to each color (such as R, G, and B or R, G, B, and W) is determined according to the image to be displayed, and then the color with a larger number of pixels is selected as the target display color. For example, the number of the pixels for displaying red is 20% of the number of all pixels, in the display panel, for displaying the image to be displayed, the number of the pixels for displaying blue is 20% of the number of all pixels, in the display panel, for displaying the image to be displayed, and the number of the pixels for displaying green is 60% of the number of all pixels, in the display panel, for displaying the image to be displayed. For example, the proportional threshold may be 30%, then green is the target display color, and all pixels displaying green are used as the target pixels. The proportional threshold may be determined according to actual needs, and the present disclosure does not limit the specific value of the proportional threshold.

For example, the reference average picture level may also be determined in other methods, for example, the average value of the first display brightness values of all pixels for displaying the image to be displayed may be taken as the reference average picture level. In the following embodiments, the brightness determination method of the embodiments of the present disclosure is explained and described by taking a case that the method to determine the reference average picture level by the above equation (1) as an example.

For example, the step S230 may be performed after obtaining the reference average picture level, to determine the target maximum display brightness value corresponding to the display panel during the display of the image to be displayed according to the reference average picture level and the information about the relationship between the average picture level and the maximum display brightness value. For example, the value range (for example, 0-1) of the average picture level may include four consecutive segment intervals: a first segment interval, a second segment interval, a third segment interval, and a fourth segment interval. In the first segment interval, the second segment interval, the third segment interval, and the fourth segment interval, the average picture level has different relations with the maximum display brightness value.

For example, the maximum display brightness value decreases as the average picture level increases in at least one segment interval. In some examples, the maximum display brightness value decreases with the increase of the average picture level in all the segment intervals (such as the first segment interval to the fourth segment interval), but the maximum display brightness value decreases at different rates in different segment intervals. In other examples, the maximum display brightness value decreases with the increase of the average picture level in some of the segment intervals (such as the second segment interval to the fourth segment interval), but the maximum display brightness value decreases at different rates in different segment intervals. For example, several segment intervals where the value of the average picture level is higher than a certain threshold may be taken as the some of the segment intervals, that is, if the minimum value of the average picture level in one or more segment intervals is higher than or equal to a certain threshold, in the one or more segment intervals, the maximum display brightness value will decrease with the increase of the average picture level.

For example, in the step S230, first, the segment interval where the reference average picture level is located can be determined, and then the reference average picture level is substituted into the formula of the corresponding segment interval to calculate the corresponding maximum display brightness value, and the calculated maximum display brightness value is used as the target maximum display brightness value corresponding to the image to be displayed.

For example, after obtaining the target maximum display brightness value, a plurality of second display brightness values corresponding to the plurality of pixels during display of the image to be displayed are determined based on the target maximum display brightness value.

For example, the target maximum display brightness value is the brightness value corresponding to the pixel with the maximum brightness in the image to be displayed, and the brightness values of the remaining pixels may be adjusted according to the maximum display brightness value. For example, for the image to be displayed, the pixel with the maximum display brightness is the pixel PxA, the first display brightness value of the pixel PxA is determined to be $L_A$ according to step S210, and the maximum display brightness value corresponding to the image to be displayed is determined to be $L_A'$ according to step S230. That is, the first display brightness value corresponding to the pixel PxA is adjusted so that the adjusted brightness value of the pixel PxA (that is, the second display brightness value corresponding to the pixel PxA) is $L_A'$. And then the second display brightness value of any remaining pixel Pxij can be determined according to the following formula (2).

$$L_{ij}'=(L_A'/L_A)*L_{ij} \qquad (2)$$

In the formula (2), $L_{ij}$ is the first display brightness value of the pixel Pxij, and $L_{ij}'$ is the second display brightness value of the pixel Pxij.

For example, after obtaining the second display brightness values of respective pixels corresponding to the image to be displayed, the image to be displayed is presented based on the second display brightness values of the respective pixels.

For example, the timing controller 140 may generate a control signal based on the second display brightness value of each pixel and provide the control signal to the data driver 120. The data driver 120 can use the control signal received from the timing controller 140 to generate the data signals, and further provide the data signals to the respective pixels by the data signal lines DL1 to DLn.

For example, in some embodiments, the timing controller 140 may further provide a clock signal, a scan start signal, and the like, suitable for the specification of the gate driver 130 to the gate driver 130. The gate driver 130 can generate scan signals to be supplied to the scan signal lines GL1 to GLm based on the clock signal, the scan start signal, or the like received from the timing controller 140. For example, in the process of presenting the image to be displayed, the gate driver 130 may turn on a row of pixels in the pixel array each time, and the data driver 120 writes the corresponding data signals into the row of pixels that is turned-on to make the row of pixels present the corresponding brightness. By turning on the pixels and writing data signals row by row in this way, the display panel can present the image to be displayed according to the second display brightness values corresponding to the respective pixels.

According to the brightness determination method of the embodiment of the present disclosure, by a method of making the maximum display brightness decrease as the average picture level increases in at least part of the segment intervals, the overall display brightness of the image to be displayed can be appropriately reduced in the case where the overall gray scale of the image to be displayed is relatively high, thereby reducing power consumption, avoiding the problem of high power consumption due to high display brightness of the display screen; the overall display brightness of the image to be displayed can be increased in the case where the overall gray scale of the image to be displayed is relatively low, thereby enhancing the detail performance, increasing the contrast, and improving the display effect. In addition, by making the maximum display brightness value have different variation rates in different segment intervals, the brightness can be adjusted in segments, thus making the brightness adjustment more flexible. For example, the average picture level may be divided into several segments according to the sensitivity of human eyes to brightness variation, and the brightness variation rate conforming to the viewing comfort of human eyes may be set in different segments, which helps to improve the comfort of human eyes when viewing and achieve better viewing effect.

For example, for any two contrast segment intervals of the at least two segment intervals (the two contrast segment intervals represent two segment intervals that may be compared in the at least two segment intervals), the any two contrast segment intervals include a first contrast segment interval and a second contrast segment interval, the maximum value of the average picture level in the first contrast segment interval is less than or equal to the minimum value of the average picture level in the second contrast segment interval. A rate of variation of the maximum display brightness value in the first contrast segment interval is less than or equal to a rate of variation of the maximum display brightness value in the second contrast segment interval.

For example, the first contrast segment interval and the second contrast segment interval may be any two segment intervals of the at least two segment intervals, may be adjacent segment intervals, or may be two segment intervals spaced apart. For the convenience of description, the any two segment intervals are named as the first contrast segment interval and the second contrast segment interval. The segment interval with smaller APL value in the any two segmented intervals is called the first contrast segment interval, and the segment interval with larger APL value is called the second contrast segment interval. The rate of variation of the maximum display brightness value in the first contrast segment interval is less than the rate of variation of the maximum display brightness value in the second contrast segment interval, which is intended to indicate that for any two segment intervals, the maximum display brightness value varies at a slower rate in the segment interval with relatively small APL value, and the maximum display brightness value varies at a faster rate in the segment interval with relatively large APL value. That is to say, with the increase of APL value, the vary speed of the maximum display brightness value will increase accordingly. Because the human eye is more sensitive to the brightness variation in the low gray scale, based on this scheme, the brightness variation can be less obvious in the case where the overall gray scale of the image to be displayed is low, which in turn is more adaptable to the human eye and enhances the viewing experience.

For example, the value range corresponding to the average picture level includes a minimum value, an intermediate value, and a maximum value, the intermediate value is an average value of the maximum value and the minimum value. The quantity of segment intervals in a range from the minimum value to the intermediate value is larger than the quantity of segment intervals in a range from the intermediate value to the maximum value.

For example, the minimum value is 0, the maximum value is 1, and the intermediate value is 0.5. The number of segment intervals in the range of 0-0.5 is greater than the number of segment intervals in the range of 0.5-1. For example, three segment intervals is in the range 0-0.5, while one segment interval is in the range 0.5-1. The more segments there are, the smoother the transition of brightness change. Therefore, based on this scheme, the transition of brightness change can be smoother in the low gray scale range where the human eye is more sensitive.

For example, the at least two segment intervals include a first segment interval, the maximum display brightness value remains constant as the average picture level varies in the first segment interval, the maximum display brightness value is a predetermined brightness value. That is, as long as the value of the reference average picture level is within the first segment interval, the target maximum display brightness value corresponding to the reference average picture level is maintained at the predetermined brightness value.

For example, in at least one segment interval of the average picture level, the maximum display brightness value remains unchanged. Based on this way, the display brightness of the images at a certain gray level can be basically the same, thus making the transition of the images more natural.

For example, the maximum value of the average picture level in the first segment interval is less than or equal to the minimum value of the average picture level in the remaining segment intervals except the first segment interval in the at least two segment intervals. That is, the first segment interval may be the segment interval with the smallest value of the average picture level among all segment intervals. Based on this method, the maximum display brightness can be kept unchanged in the low gray scale range where the human eye is more sensitive to the brightness change, and therefore the comfort of the human eye when viewing can be improved.

For example, the at least two segment intervals further include a second segment interval, a third segment interval, and a fourth segment interval, a value of the average picture level is continuous from the first segment interval to the fourth segment interval and successively increases from the first segment interval to the fourth segment interval. The maximum display brightness value decreases with the increase of the average picture level in the second segment interval to the fourth segment interval.

Figure 3:
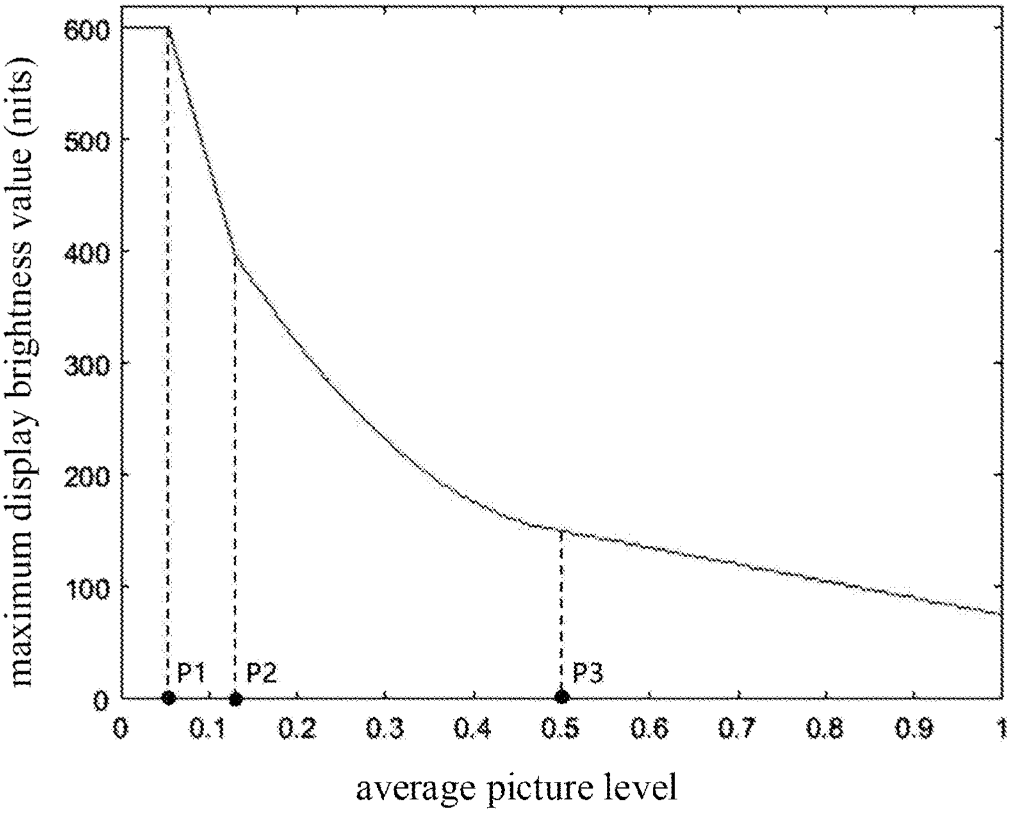
FIG. 3 shows a schematic diagram of a relationship curve between the maximum display brightness value and the average picture level according to at least one embodiment of the present disclosure.

FIG. 3 shows a schematic diagram of a relationship curve between the maximum display brightness value and the average picture level according to at least one embodiment of the present disclosure. In the curve shown in FIG. 3, the abscissa represents the normalized average picture level, and the ordinate represents the maximum display brightness value.

As shown in FIG. 3, for example, the value range corresponding to the average picture level includes a minimum value 0, a first value P1, a second value P2, a third value P3, and a maximum value 1, the first value P1, the second value P2, and the third value P3 are between the minimum value 0 and the maximum value 1 and increase in turn; the minimum value 0 and the first value P1 are two interval endpoints of the first segment interval, respectively; the first value P1 and the second value P2 are two interval endpoints of the second segment interval, respectively; the second value P2 and the third value P3 are two interval endpoints of the third segment interval, respectively; and the third value P3 and the maximum value 1 are two interval endpoints of the fourth segment interval, respectively.

For example, depending on the sensitivity of the human eyes to changes in brightness, the first value P1 may be a value less than or equal to 0.1, the second value P2 may be a value greater than or equal to 0.1 and less than or equal to 0.2, and the third value P3 may be a value greater than or equal to 0.3 and less than or equal to 0.7.

For example, according to the sensitivity of the human eyes to changes in brightness, the first value P1 can be set as 0.05, the second value P2 is set as 0.125, and the third value P3 is set as 0.5, so that the first segment interval is $0<APL\leq 0.05$, the second segment interval is $0.05\leq APL\leq 0.125$, the third segment interval is $0.125\leq APL\leq 0.5$, and the fourth segment interval is $0.5\leq APL\leq 1$.

For example, the corresponding maximum display brightness values in the case where the average picture level is the minimum value, the first value, the second value, the third value, and the maximum value, respectively, may be determined in combination with the power consumption, so that the power consumption corresponding to the maximum display brightness value in any segment interval does not exceed the predetermined power consumption range. In the embodiments of the present disclosure, for different display images, the maximum display brightness value of the screen can be adjusted according to different APLs, so that the image have relatively high display brightness in a case of ensuring that the power consumption does not exceed the standard. For example, in the case where the value of the average picture level is 0.05, the maximum display brightness value L (L, for example, is 600 nit (nit)) corresponding to the maximum power consumption within the predetermined power consumption range is calculated, and the maximum display brightness value L is taken as the predetermined brightness value corresponding to the first segment interval. For example, in the case where the display panel displays the screen in the case of a monochrome, 255 gray scale, 10% window, the maximum display brightness value of the display panel is the above predetermined brightness value, and the predetermined brightness value may be 600 nit. In the case where the value of the average picture level is 0.125, the maximum display brightness value (for example, 400 nit) corresponding to the maximum power consumption within the predetermined power consumption range is calculated. In the case where the value of the average picture level is 0.5, the maximum display brightness value (for example, 150 nit) corresponding to the maximum power consumption within the predetermined power consumption range is calculated. In the case where the average picture level value is 1, the maximum display brightness value (for example, 75 nit) corresponding to the maximum power consumption within the predetermined power consumption range is calculated.

For example, in the first segment interval APL∈(0~0.05], the maximum display brightness value is maintained as the predetermined brightness value, for example, the predetermined brightness value is 600 nit, that is, the information about the relationship between the maximum display brightness value and the average picture level is expressed as the formula: Lmax=L. For example, in the case where the average picture level corresponding to the image to be displayed is less than or equal to the average picture level corresponding to the image in the case of monochrome, 255 gray scale, 10% window, the maximum display brightness value of the display panel is 600 nit during the period when the display panel displays the image to be displayed.

For example, in the second segment interval APL∈[0.05-0.125], the information about the relationship between the maximum display brightness value and the average picture level is expressed as the relationship formula (3).

$$L\max=L*(a1-b1*\mathrm{APL}) \tag{3}$$

In the formula (3), Lmax is the maximum display brightness value, L is the predetermined brightness value, APL is the average picture level, and a1 and b1 are constants and may be set according to actual situation. For example, in the second segment interval, the maximum display brightness value of the full screen is, for example, between 400-600 nit. For example, in the case where the average picture level corresponding to the image to be displayed is greater than or equal to the average picture level corresponding to the image in the case of monochrome, 255 gray scale, 10% window, and is less than or equal to the average picture level corresponding to the image in the case of monochrome, 255 gray scale, 25% window, the maximum display brightness value of the display panel is between 400-600 nit during the period when the display panel displays the image to be displayed. The specific value of the maximum display brightness value may be calculated according to the relationship formula (3).

For example, in the third segment interval APL∈[0.125-0.5], the information about the relationship between the maximum display brightness value and the average picture level is expressed as the relationship formula (4).

$$L\max=L*(a2*\mathrm{APL}^2-b2*\mathrm{APL}+c2) \tag{4}$$

In the formula (4), a2, b2, and c2 are constants and may be set according to actual situation. For example, in the third segment interval, the maximum display brightness value of the full screen is, for example, between 150-400 nit. For example, in the case where the average picture level corresponding to the image to be displayed is greater than or equal to the average picture level corresponding to the image in the case of monochrome, 255 gray scale, 25% window, and is less than or equal to the average picture level corresponding to the image in the case of monochrome, 255 gray scale, 100% window, the maximum display brightness value of the display panel is between 150-400 nit during the period when the display panel displays the image to be displayed. The specific value of the maximum display brightness value may be calculated according to the relationship formula (4).

For example, in the fourth segment interval APL∈[0.5-1], the information about the relationship between the maximum display brightness value and the average picture level is expressed as the relationship formula (5).

$$L\max=L*(a3-b3*\mathrm{APL}) \tag{5}$$

In the formula (5), a3 and b3 are constants and may be set according to actual situation. For example, b3 is greater than b1, that is, the slope of the variation line of the maximum display brightness value in the fourth segment interval is greater than the slope of the variation line of the maximum display brightness value in the second segment interval, and the variation rate of the maximum display brightness value in the fourth segment interval is larger.

For example, in the fourth segment interval, the maximum display brightness value of the full screen is, for example, between 75-150 nit. For example, in the case where the average picture level corresponding to the image to be displayed is greater than or equal to the average picture level corresponding to the image in the case of monochrome, 255 gray scale, 100% window, and is less than or equal to the average picture level corresponding to the image in the case of mixed color, 255 gray scale, 100% window, the maximum display brightness value of the display panel is between 75-150 nit during the period when the display panel displays the image to be displayed. The specific value of the maximum display brightness value may be calculated according to the relationship formula (5).

For example, the curve of the maximum display brightness value varying with the average picture level is continuous in the four segment intervals and smoothly transitions at division points.

For example, in addition to the segmentation method in the above embodiment, other segmentation methods may also be adopted. For example, the value range of the average picture level may be divided into two segment intervals, three segment intervals, or more than four segment intervals. For example, in addition to the segmentation point values in the above embodiments, other segmentation point values may also be adopted. In the actual application, the number of segment intervals and the segmentation point values of the segment intervals may be set according to the demand.

For example, table 1 below shows the brightness data obtained from the actual test after the brightness is adjusted according to the brightness determination method of the embodiment of the present disclosure.

TABLE 1

| | Screen | APL | Maximum display brightness value(nit) |
|---|---|---|---|
| 1 | 1.1% W255 | 0.0055 | 527.1 |
| 2 | 4.3% W255 | 0.0217 | 526.7 |
| 3 | 10.0% W255 | 0.05 | 523.9 |
| 4 | 16.0% W255 | 0.08 | 521.5 |
| 5 | 17.0% W255 | 0.085 | 517.8 |
| 6 | 25.0% W255 | 0.125 | 515.8 |
| 7 | 27.0% W255 | 0.135 | 462.5 |
| 8 | 39.0% W255 | 0.195 | 397.2 |
| 9 | 50.0% W255 | 0.25 | 396.5 |
| 10 | 53.0% W255 | 0.265 | 378.2 |
| 11 | 69.0% W255 | 0.345 | 295.1 |
| 12 | 75.0% W255 | 0.375 | 277.1 |
| 13 | 88.0% W255 | 0.44 | 231.8 |
| 14 | 100.0% W255 | 0.5 | 200.6 |
| 15 | RB color mixing | 1 | 102 |

TABLE 1-continued

| Screen | APL | Maximum display brightness value(nit) |
|---|---|---|

For example, 1.1% W255 in table 1 represents the display in the case of white, 255 gray scale, and 1.1% window; 4.3% W255 represents the display in the case of white, 255 grayscale, and 4.3% window; 100.0% W255 represents the display in the case of white, 255 grayscale, and 100% window; and so on. RB color mixing represents the display in the case of mixing red and blue, maximum gray scale (255 gray scale), and 100% full screen.

Figure 4:
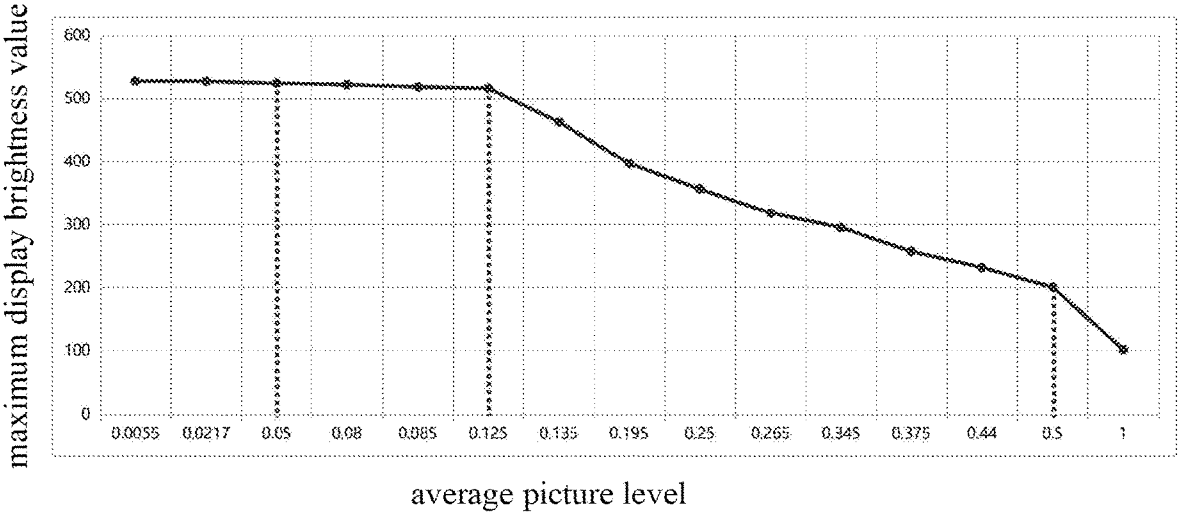
FIG. 4 shows a schematic diagram of a relationship curve between the maximum display brightness value and the average picture level drawn according to the data in Table 1 according to at least one embodiment of the present disclosure.

FIG. 4 shows a schematic diagram of a relationship curve between the maximum display brightness value and the average picture level drawn according to the data in Table 1 according to at least one embodiment of the present disclosure. In the curve shown in FIG. 4, the abscissa represents the normalized average picture level, and the ordinate represents the maximum display brightness value.

As shown in FIG. 4, in the case of APL≤0.125, the maximum display brightness value Lmax is between 515.8-527.1, and the maximum display brightness value in the first segment interval is basically maintained at about 527 nit. In the case of 0.125≤APL≤0.5, the maximum display brightness value decreases with the increase of APL, and the range of the maximum display brightness value is 200-527 nit. In the case of 0.5≤APL≤1, the range of the maximum display brightness value is 100-200 nit, and the decrease speed of the maximum display brightness value decreasing with the increase of APL increases. Therefore, the trend and value of the maximum display brightness value varying with the variation of APL obtained from the actual test are basically consistent with the above relationship formula representing the information about the relationship between the maximum display brightness value and the average picture level.

Figure 5:
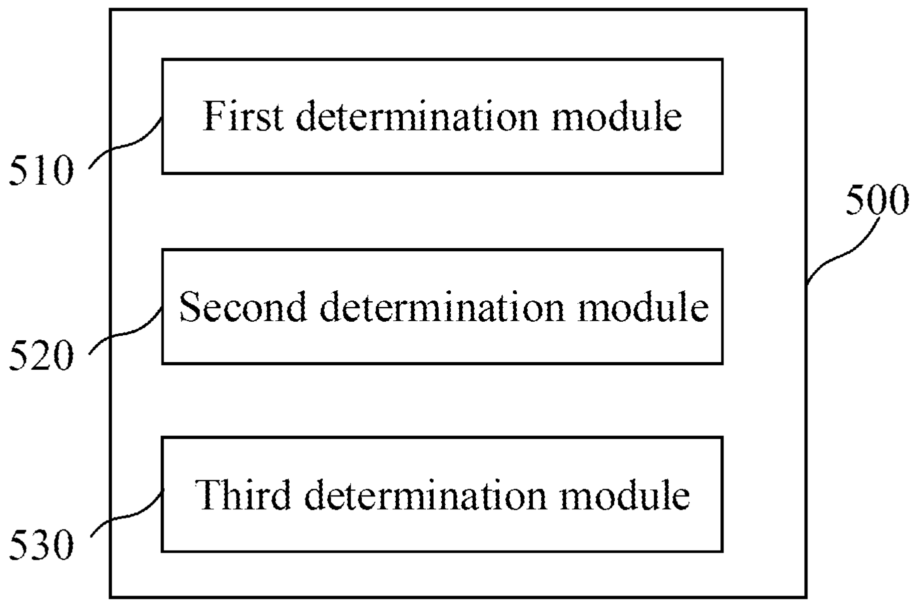
FIG. 5 shows a schematic block diagram of a brightness determination device according to at least one embodiment of the present disclosure.

FIG. 5 shows a schematic block diagram of a brightness determination device according to at least one embodiment of the present disclosure.

For example, as shown in FIG. 5, the brightness determination device 500 includes a first determination module 510, a second determination module 520, and a third determination module 530.

The first determination module 510 is configured to determine first display brightness values corresponding to the plurality of pixels respectively based on an image to be displayed. The first determination module 510 may perform the step S210 described in FIG. 2, for example.

The second determination module 520 is configured to determine a reference average picture level corresponding to the image to be displayed based on the first display brightness values corresponding to the plurality of pixels respectively. The second determination module 520 may perform the step S220 described in FIG. 2, for example.

The third determination module 530 is configured to determine a target maximum display brightness value corresponding to the display panel during display of the image to be displayed based on the reference average picture level and information about a relationship between an average picture level and a maximum display brightness value. For example, a value range corresponding to the average picture level includes at least two segment intervals, the information about the relationship includes information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases. The third determination module 530 may perform the step S230 described in FIG. 2, for example.

For example, the first determination module 510, the second determination module 520, and the third determination module 530 may be implemented as hardware, software, firmware, and any feasible combination thereof. For example, the first determination module 510, the second determination module 520, and the third determination module 530 may be a special or general circuit, chip, or device, etc., or a combination of processor and memory. The embodiments of the present disclosure do not limit the specific implementation forms of the above units.

It should be noted that in the embodiments of the present disclosure, each module of the brightness determination device 500 corresponds to each step of the aforementioned brightness determination method. For the specific functions and technical effects of the brightness determination device 500, reference may be made to the relevant description of the brightness determination method, and similar portions will not be repeated here. The components and structures of the brightness determination device 500 shown in FIG. 5 are only exemplary, not restrictive. The brightness determination device 500 may further include other components and structures as required.

For example, the brightness determination device 500 may further include a fourth determination module and a display module, the fourth determination module is configured to determine a plurality of second display brightness values corresponding to the plurality of pixels during display of the image to be displayed based on the target maximum display brightness value. The display module is configured to display the image to be displayed based on the plurality of second display brightness values. The display module may include a display screen.

For example, the second determination module 520 is further configured to determine the reference average picture level corresponding to the image to be displayed according to the first display brightness values corresponding to all of the plurality of pixels.

For example, the second determination module 520 is further configured to determine at least one target pixel from the plurality of pixels; determine the reference average picture level corresponding to the image to be displayed based on the at least one first display brightness value corresponding to the at least one target pixel.

For example, the second determination module 520 is further configured to select at least one pixel whose first display brightness value is greater than a brightness threshold from the plurality of pixels as the at least one target pixel.

For example, the second determination module 520 is further configured to determine display colors corresponding to the plurality of pixels respectively based on the image to be displayed; determine at least one target display color based on the display colors corresponding to the plurality of pixels respectively, a ratio between the number of pixels displaying each of the at least one target display color and the number of the plurality of pixels being greater than a proportion threshold; select at least one pixel corresponding to the target display color from the plurality of pixels as the at least one target pixel.

For example, for any two contrast segment intervals of the at least two segment intervals, the any two contrast segment intervals include a first contrast segment interval and a second contrast segment interval, the maximum value of the average picture level in the first contrast segment interval is less than or equal to the minimum value of the average picture level in the second contrast segment interval. A rate of variation of the maximum display brightness value in the first contrast segment interval is less than or equal to a rate of variation of the maximum display brightness value in the second contrast segment interval.

For example, the value range corresponding to the average picture level includes a minimum value, an intermediate value, and a maximum value, the intermediate value is an average value of the maximum value and the minimum value. The number of segment intervals in a range from the minimum value to the intermediate value is greater than the number of segment intervals in the range from the intermediate value to the maximum value.

For example, the at least two segment intervals include a first segment interval, the maximum display brightness value remains constant as the average picture level varies in the first segment interval, and the maximum display brightness value is a predetermined brightness value.

For example, the value of the average picture level in the first segment interval is less than the value of the average picture level in remaining segment intervals of the at least two segment intervals other than the first segment interval.

For example, the at least two segment intervals further include a second segment interval, a third segment interval, and a fourth segment interval, a value of the average picture level is continuous from the first segment interval to the fourth segment interval and successively increases from the first segment interval to the fourth segment interval. In the second segment interval, the information about the relationship between the maximum display brightness value and the average picture level is expressed as a relationship formula: $Lmax=L*(a1-b1*APL)$, Lmax is the maximum display brightness value, L is the predetermined brightness value, APL is the average picture level, and a1 and b1 are constants. In the third segment interval, the information about the relationship between the maximum display brightness value and the average picture level is expressed as a relationship formula: $Lmax=L*(a2*APL^2-b2*APL+c2)$, a2, b2, and c2 are constants. In the fourth segment interval, the information about the relationship between the maximum display brightness value and the average picture level is expressed as a relationship formula: $Lmax=L*(a3-b3*APL)$, a3 and b3 are constants.

For example, the value range corresponding to the average picture level includes a minimum value, a first value, a second value, a third value, and a maximum value, the first value, the second value, and the third value are between the minimum value and the maximum value and increase in turn. The minimum value and the first value are two interval endpoints of the first segment interval, respectively; the first value and the second value are two interval endpoints of the second segment interval, respectively; the second value and the third value are two interval endpoints of the third segment interval, respectively; and the third value and the maximum value are two interval endpoints of the fourth segment interval, respectively.

At least one embodiment of the present disclosure further provides an electronic equipment, and the electronic equipment includes a processor and a memory configured to store one or more computer program modules. The one or more computer program modules are configured to be executed by the processor, and the one or more computer program modules include instructions for implementing the brightness determination method described above. According to the electronic equipment, by making the maximum display brightness decrease as the average picture level increases in at least part of the segment intervals, the overall display brightness of the image to be displayed can be appropriately reduced in the case where the overall gray scale of the image to be displayed is relatively high, thereby reducing power consumption, avoiding the problem of high power consumption due to high display brightness of the display screen; the overall display brightness of the image to be displayed can be increased in the case where the overall gray scale of the image to be displayed is relatively low, thereby enhancing the detail performance, increasing the contrast, and improving the display effect. In addition, by making the maximum display brightness value have different variation rates in different segment intervals, the brightness can be adjusted in segments, and therefore, the brightness adjustment can be more flexible. For example, the average picture level may be divided into several segments according to the sensitivity of human eyes to brightness variation, and the brightness variation rate conforming to the viewing comfort of human eyes may be set in different segments, which helps to improve the comfort of human eyes when viewing and achieve better viewing effect.

Figure 6:
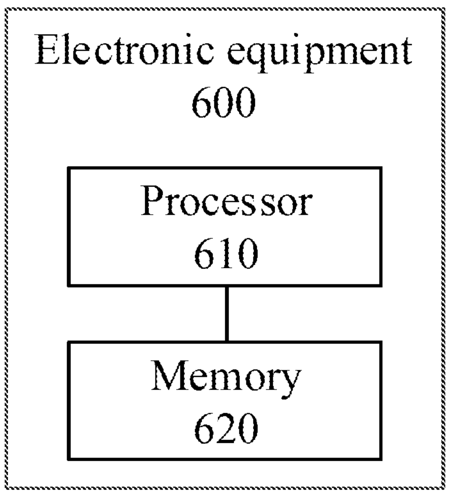
FIG. 6 shows a schematic block diagram of an electronic equipment according to at least one embodiment of the present disclosure.

FIG. 6 shows a schematic block diagram of an electronic equipment according to some embodiments of the present disclosure. As shown in FIG. 6, the electronic equipment 600 includes a processor 610 and a memory 620. The memory 620 is configured to store non-transitory computer-readable instructions (e. g., one or more computer program modules). The processor 610 is configured to execute the non-transitory computer-readable instructions, and when the non-transitory computer-readable instructions are executed by the processor 610, one or more steps of the brightness determination method described above can be performed. The memory 620 and the processor 610 may be interconnected by a bus system and/or other form of connection mechanism (not shown).

For example, the processor 610 may be a central processing unit (CPU), a graphics processing unit (GPU), or other form of processing unit with data processing capability and/or program execution capability. For example, the central processing unit (CPU) may be X86 or ARM architecture. The processor 610 may be a general-purpose processor or a dedicated processor and may control other components in the electronic equipment 600 to perform a desired function.

For example, the memory 620 may include any combination of one or more computer program products, the computer program products may include various forms of computer-readable storage media, such as volatile memory and/or non-volatile memory. The volatile memory may include, for example, random access memory (RAM) and/or cache memory. The non-volatile memory may include, for example, a read-only memory (ROM), a hard disk, an erasable programmable read-only memory (EPROM), a portable compact disk read-only memory (CD-ROM), a USB memory, a flash memory, and the like. One or more computer program modules may be stored on the computer-readable storage medium, and the processor 610 may run one or more computer program modules to implement various functions of the electronic equipment 600. The computer readable storage medium may further store various application programs and various data as well as various data used and/or generated by the application programs.

It should be noted that in the embodiment of the present disclosure, for the specific functions and technical effects of the electronic equipment 600, reference may be made to the above description of the brightness determination method, which will not be repeated here.

Figure 7:
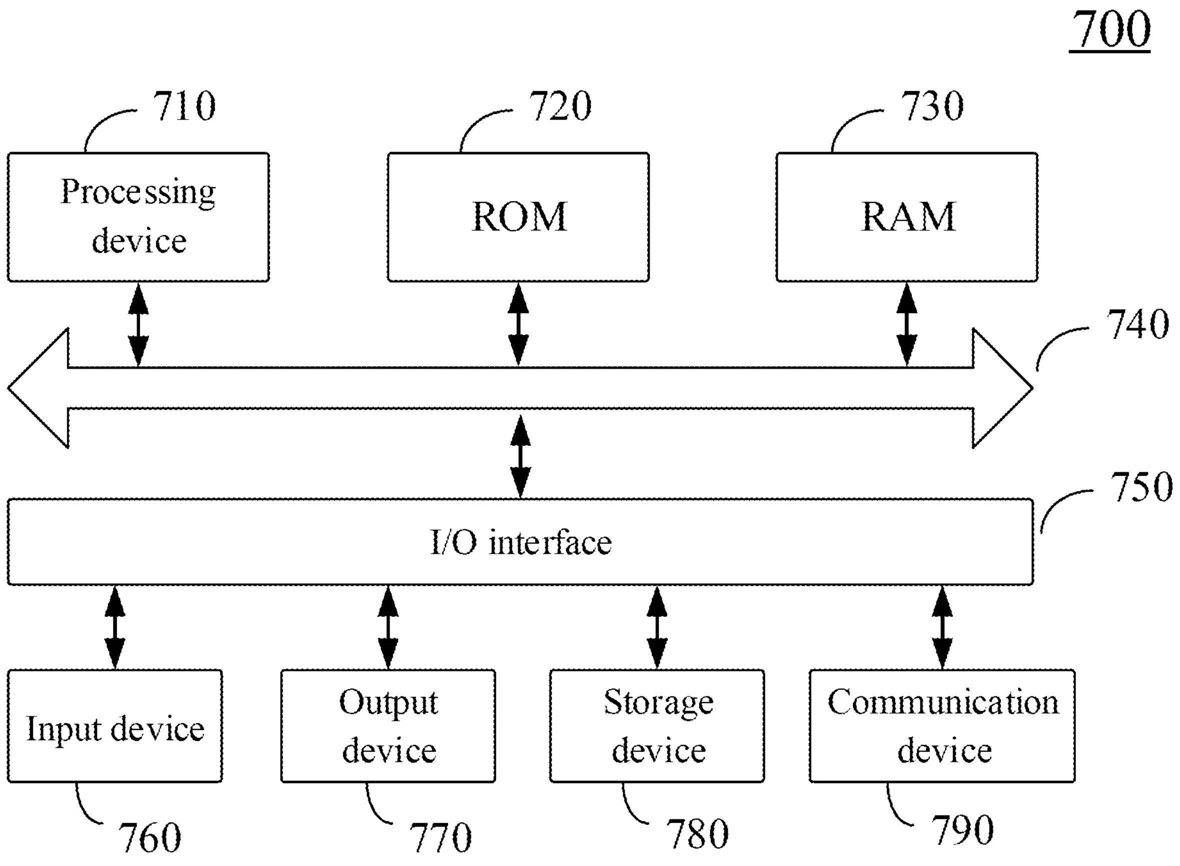
FIG. 7 shows a schematic block diagram of another electronic equipment according to at least one embodiment of the present disclosure.

FIG. 7 shows a schematic block diagram of another electronic equipment according to at least one embodiment of the present disclosure. The electronic equipment 700 is adapted, for example, to implement the brightness determination method provided by the embodiments of the present disclosure. The electronic equipment 700 may be the terminal equipment or the like. It should be noted that the electronic equipment 700 shown in FIG. 7 is only an example, and it will not impose any restrictions on the functions and scope of use of the embodiments of the present disclosure.

As shown in FIG. 7, the electronic equipment 700 may include a processing device (such as a central processor, a graphics processor, etc.) 710, which may perform various appropriate actions and processes according to programs stored in the read-only memory (ROM) 720 or programs loaded into the random access memory (RAM) 730 from the storage device 780. Various programs and data required for the operation of the electronic equipment 700 are also stored in the RAM 730. The processing device 710, the ROM 720, and the RAM 730 are connected to each other via bus 740. Input/output (I/O) interface 750 is also connected to the bus 740.

Generally, the following devices may be connected to the I/O interface 750: an input device 760 including, for example, a touch screen, a touch pad, a keyboard, a mouse, a camera, a microphone, an accelerometer, a gyroscope, etc., an output device 770 including, for example, a liquid crystal display (LCD), a loudspeaker, a vibrator, etc., a storage device 780 including, for example, a tape, a hard disk, etc., and a communication device 790. The communication device 790 may allow the electronic equipment 700 to communicate wirelessly or by wire with other electronic devices to exchange data. Although FIG. 7 shows the electronic equipment 700 with various devices, it should be understood that it is not required to implement or include all the devices shown, and the electronic equipment 700 may alternatively implement or include more or fewer devices.

For example, according to the embodiments of the present disclosure, the above brightness determination method may be implemented as a computer software program. For example, the embodiments of the present disclosure include a computer program product, which includes a computer program loaded in a non-transient computer-readable medium, and the computer program includes program code for executing the above brightness determination method. In such an embodiment, the computer program may be downloaded and installed from the network through the communication device 790, or installed from the storage device 780, or installed from the ROM 720. When the computer program is executed by the processing device 710, the functions defined in the brightness determination method provided by the embodiments of the present disclosure can be achieved.

At least one embodiment of the present disclosure further provides a computer-readable storage medium, the computer-readable storage medium is configured to store non-transitory computer-readable instructions. The above brightness determination method can be achieved when the non-transitory computer-readable instructions are executed by a computer. In the brightness determination method that can be achieved when the non-transitory computer-readable instructions stored in the computer-readable storage medium are executed by a computer, by a method of making the maximum display brightness decrease as the average picture level increases in at least part of the segment intervals, the overall display brightness of the image to be displayed can be appropriately reduced in the case where the overall gray scale of the image to be displayed is relatively high, thereby reducing power consumption, avoiding the problem of high power consumption due to high display brightness of the display screen; the overall display brightness of the image to be displayed can be increased in the case where the overall gray scale of the image to be displayed is relatively low, thereby enhancing the detail performance, increasing the contrast, and improving the display effect. In addition, by making the maximum display brightness value have different variation rates in different segment intervals, the brightness can be adjusted in segments, and thus the brightness adjustment can be more flexible. For example, the average picture level may be divided into several segments according to the sensitivity of human eyes to brightness variation, and the brightness variation rate conforming to the viewing comfort of human eyes may be set in different segments, which helps to improve the comfort of human eyes when viewing and achieve better viewing effect.

Figure 8:
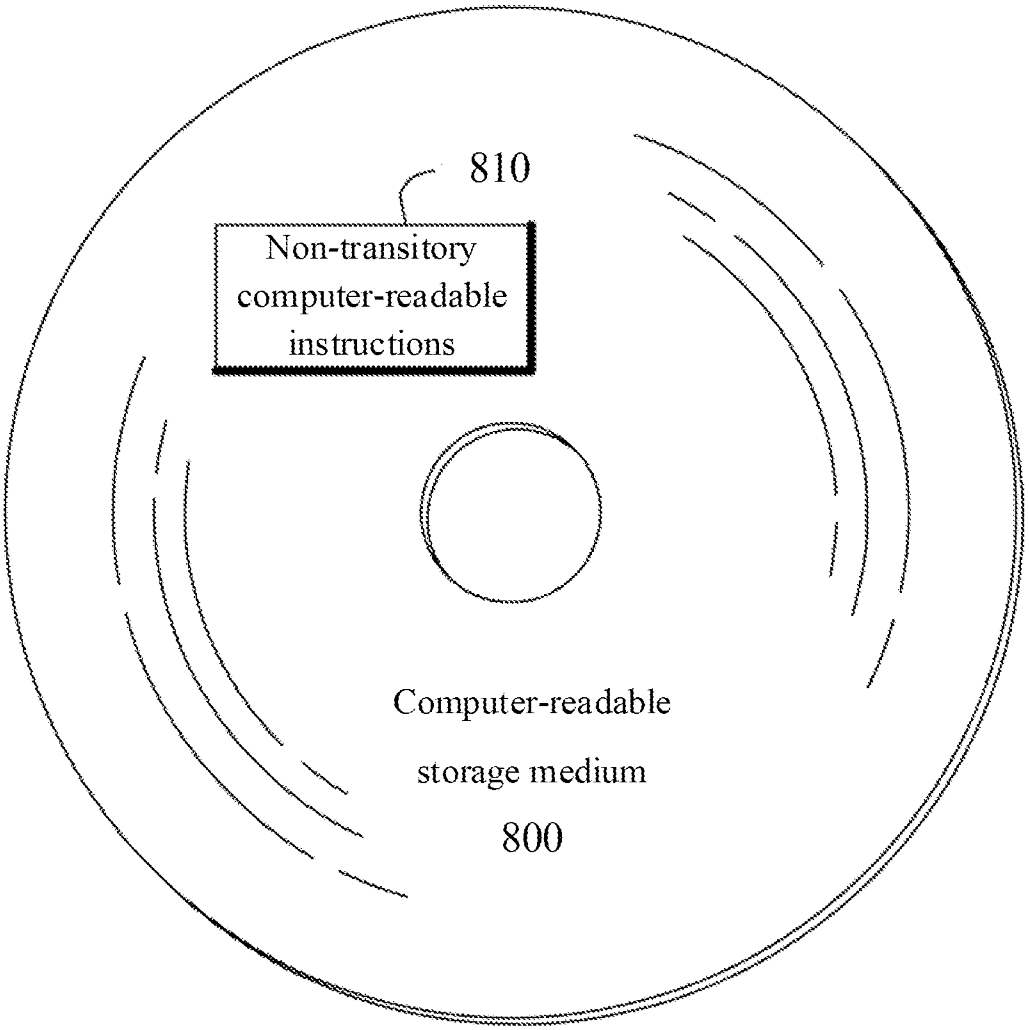
FIG. 8 shows a schematic diagram of a computer-readable storage medium according to at least one embodiment of the present disclosure.

FIG. 8 shows a schematic diagram of a computer-readable storage medium according to at least one embodiment of the present disclosure. As shown in FIG. 8, the computer-readable storage medium 800 is configured to store non-transitory computer-readable instructions 810. For example, one or more steps in the brightness determination method described above may be performed when the non-transitory computer-readable instructions 810 are executed by a computer.

For example, the computer-readable storage medium 800 may be a non-transitory computer-readable storage medium.

For example, the computer-readable storage medium 800 may be applied to the electronic equipment 600 described above. For example, the computer-readable storage medium 800 may be the memory 620 in the electronic equipment 600 shown in FIG. 6. For example, for the description of the computer-readable storage medium 800, reference may be made to the corresponding description of the memory 620 in the electronic equipment 600 shown in FIG. 6, and will not be repeated here.

The following statements should be noted:

(1) The accompanying drawings involve only the structure(s) in connection with the embodiment(s) of the present disclosure, and other structure(s) can refer to common design(s).

(2) In case of no conflict, embodiments of the present disclosure and features in the embodiments can be combined to obtain new embodiments.

What have been described above are only specific implementations of the present disclosure, but the protection scope of the present disclosure is not limited thereto. The protection scope of the present disclosure should be subject to the protection scope of the claims.

The invention claimed is:

1. A brightness determination method, used for a display panel, wherein the display panel comprises a plurality of pixels, the method comprises:

determining, based on an image to be displayed, first display brightness values corresponding to the plurality of pixels respectively;

determining, based on the first display brightness values corresponding to the plurality of pixels respectively, a reference average picture level corresponding to the image to be displayed; and determining, based on the reference average picture level and information about a relationship between an average picture level and a maximum display brightness value, a target maximum display brightness value corresponding to the display panel during display of the image to be displayed, wherein a value range corresponding to the average picture level comprises at least two segment intervals, the information about the relationship comprises information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases;

wherein determining, based on the first display brightness values corresponding to the plurality of pixels respectively, the reference average picture level corresponding to the image to be displayed, comprises:

determining, based on the image to be displayed, display colors corresponding to the plurality of pixels respectively;

determining, based on the display colors corresponding to the plurality of pixels respectively, at least one target display color, wherein a ratio between a quantity of pixels displaying each of the at least one target display color and a quantity of the plurality of pixels is greater than a proportion threshold;

selecting at least one pixel corresponding to the at least one target display color from the plurality of pixels as the at least one target pixel; and determining, based on at least one first display brightness value corresponding to the at least one target pixel, the reference average picture level corresponding to the image to be displayed.

2. The method according to claim 1, wherein for any two contrast segment intervals of the at least two segment intervals, the any two contrast segment intervals comprise a first contrast segment interval and a second contrast segment interval, a maximum value of the average picture level in the first contrast segment interval is less than or equal to a minimum value of the average picture level in the second contrast segment interval, a rate of variation of the maximum display brightness value in the first contrast segment interval is less than or equal to a rate of variation of the maximum display brightness value in the second contrast segment interval.

3. The method according to claim 2, wherein the value range corresponding to the average picture level comprises a minimum value, an intermediate value, and a maximum value, the intermediate value is an average value of the maximum value and the minimum value, and a quantity of segment intervals in a range from the minimum value to the intermediate value is greater than a quantity of segment intervals in a range from the intermediate value to the maximum value.

4. The method according to claim 2, wherein the at least two segment intervals comprise a first segment interval, the maximum display brightness value remains constant as the average picture level varies in the first segment interval, the maximum display brightness value is a predetermined brightness value.

5. The method according to claim 4, wherein a value of the average picture level in the first segment interval is less than a value of the average picture level in remaining segment intervals of the at least two segment intervals other than the first segment interval.

6. The method according to claim 5, wherein the at least two segment intervals further comprise a second segment interval, a third segment interval, and a fourth segment interval, a value of the average picture level is continuous from the first segment interval to the fourth segment interval and successively increases from the first segment interval to the fourth segment interval, in the second segment interval, the information about the relationship between the maximum display brightness value and the average picture level is expressed as a relationship formula: $Lmax=L*(a1-b1*APL)$, wherein Lmax is the maximum display brightness value, L is the predetermined brightness value, APL is the average picture level, and a1 and b1 are constants;

in the third segment interval, the information about the relationship between the maximum display brightness value and the average picture level is expressed as a relationship formula: $Lmax=L*(a2*APL^2-b2*APL+c2)$, wherein a2, b2, and c2 are constants; and in the fourth segment interval, the information about the relationship between the maximum display brightness value and the average picture level is expressed as a relationship formula: $Lmax=L*(a3-b3*APL)$, wherein a3 and b3 are constants.

7. The method according to claim 1, wherein the value range corresponding to the average picture level comprises a minimum value, an intermediate value, and a maximum value, the intermediate value is an average value of the maximum value and the minimum value, and a quantity of segment intervals in a range from the minimum value to the intermediate value is greater than a quantity of segment intervals in a range from the intermediate value to the maximum value.

8. The method according to claim 1, wherein the at least two segment intervals comprise a first segment interval, the maximum display brightness value remains constant as the average picture level varies in the first segment interval, the maximum display brightness value is a predetermined brightness value.

9. The method according to claim 8, wherein a value of the average picture level in the first segment interval is less than a value of the average picture level in remaining segment intervals of the at least two segment intervals other than the first segment interval.

10. The method according to claim 9, wherein the at least two segment intervals further comprise a second segment interval, a third segment interval, and a fourth segment interval, a value of the average picture level is continuous from the first segment interval to the fourth segment interval and successively increases from the first segment interval to the fourth segment interval, in the second segment interval, the information about the relationship between the maximum display brightness value and the average picture level is expressed as a relationship formula: $Lmax=L*(a1-b1*APL)$, wherein Lmax is the maximum display brightness value, L is the predetermined brightness value, APL is the average picture level, and a1 and b1 are constants;

in the third segment interval, the information about the relationship between the maximum display brightness value and the average picture level is expressed as a relationship formula: $Lmax=L*(a2*APL^2-b2*APL+c2)$, wherein a2, b2, and c2 are constants; and in the fourth segment interval, the information about the relationship between the maximum display brightness value and the average picture level is expressed as a relationship formula: Lmax=L*(a3−b3*APL), wherein a3 and b3 are constants.

11. The method according to claim 10, wherein the value range corresponding to the average picture level comprises a minimum value, a first value, a second value, a third value, and a maximum value, wherein the first value, the second value, and the third value are between the minimum value and the maximum value and increase in turn;

the minimum value and the first value are two interval endpoints of the first segment interval, respectively; the first value and the second value are two interval endpoints of the second segment interval, respectively; the second value and the third value are two interval endpoints of the third segment interval, respectively; and the third value and the maximum value are two interval endpoints of the fourth segment interval, respectively.

12. The method according to claim 1, further comprising:

determining, based on the target maximum display brightness value, a plurality of second display brightness values corresponding to the plurality of pixels during the display of the image to be displayed; and displaying, based on the plurality of second display brightness values, the image to be displayed.

13. A display panel, comprising:

a plurality of pixels; and a timing controller, configured to perform the brightness determination method according to claim 1.

14. A computer-readable storage medium for storing non-transitory computer-readable instructions, wherein the brightness determination method according to claim 1 is implemented when the non-transitory computer-readable instructions are executed by a computer.

15. A brightness determination device, used for a display panel, wherein the display panel comprises a plurality of pixels, the brightness determination device comprises:

a first determination module, configured to determine, based on an image to be displayed, first display brightness values corresponding to the plurality of pixels respectively;

a second determination module, configured to determine a reference average picture level corresponding to the image to be displayed based on the first display brightness values corresponding to the plurality of pixels respectively; and a third determination module, configured to determine a target maximum display brightness value corresponding to the display panel during display of the image to be displayed based on the reference average picture level and information about a relationship between an average picture level and a maximum display brightness value, wherein a value range corresponding to the average picture level comprises at least two segment intervals, the information about the relationship comprises information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases;

wherein the second determination module is further configured to:

determine, based on the image to be displayed, display colors corresponding to the plurality of pixels respectively;

determine, based on the display colors corresponding to the plurality of pixels respectively, at least one target display color, wherein a ratio between a quantity of pixels displaying each of the at least one target display color and a quantity of the plurality of pixels is greater than a proportion threshold;

select at least one pixel corresponding to the at least one target display color from the plurality of pixels as the at least one target pixel; and determine, based on at least one first display brightness value corresponding to the at least one target pixel, the reference average picture level corresponding to the image to be displayed.

16. An electronic equipment, comprising:

a processor;

a memory, configured to store one or more computer program modules;

wherein the one or more computer program modules are configured to be executed by the processor, and the one or more computer program modules comprise instructions for implementing a brightness determination method;

the brightness determination method is used for a display panel, the display panel comprises a plurality of pixels, the method comprises:

determining, based on an image to be displayed, first display brightness values corresponding to the plurality of pixels respectively;

determining, based on the first display brightness values corresponding to the plurality of pixels respectively, a reference average picture level corresponding to the image to be displayed; and determining, based on the reference average picture level and information about a relationship between an average picture level and a maximum display brightness value, a target maximum display brightness value corresponding to the display panel during display of the image to be displayed, wherein a value range corresponding to the average picture level comprises at least two segment intervals, the information about the relationship comprises information on variation of the maximum display brightness value with the average picture level in the at least two segment intervals; in different segment intervals, the maximum display brightness value varies at different rates with the average picture level; in at least one of the segment intervals, the maximum display brightness value decreases as the average picture level increases;

wherein determining, based on the first display brightness values corresponding to the plurality of pixels respectively, the reference average picture level corresponding to the image to be displayed, comprises:

determining, based on the image to be displayed, display colors corresponding to the plurality of pixels respectively;

determining, based on the display colors corresponding to the plurality of pixels respectively, at least one target display color, wherein a ratio between a quantity of pixels displaying each of the at least one target display color and a quantity of the plurality of pixels is greater than a proportion threshold;

selecting at least one pixel corresponding to the at least one target display color from the plurality of pixels as the at least one target pixel; and determining, based on at least one first display brightness value corresponding to the at least one target pixel, the reference average picture level corresponding to the image to be displayed.

* * * * *